US010869489B2

(12) United States Patent
Blaine et al.

(10) Patent No.: US 10,869,489 B2
(45) Date of Patent: Dec. 22, 2020

(54) PORTIONING ACCURACY ANALYSIS

(71) Applicant: John Bean Technologies Corporation, Chicago, IL (US)

(72) Inventors: George R. Blaine, Lake Stevens, WA (US); John R. Strong, Bellevue, WA (US); Matthew Falkoski, Bothell, WA (US); Richard D. Stockard, Kirkland, WA (US)

(73) Assignee: John Bean Technologies Corporation, Chicago, IL (US)

( * ) Notice: Subject to any disclaimer, the term of this patent is extended or adjusted under 35 U.S.C. 154(b) by 0 days.

(21) Appl. No.: 16/556,951

(22) Filed: Aug. 30, 2019

(65) Prior Publication Data

US 2020/0068909 A1 Mar. 5, 2020

Related U.S. Application Data

(60) Provisional application No. 62/725,814, filed on Aug. 31, 2018.

(51) Int. Cl.
*A22C 17/00* (2006.01)
*G05B 19/416* (2006.01)
(Continued)

(52) U.S. Cl.
CPC ........ *A22C 17/0086* (2013.01); *A22C 17/008* (2013.01); *B26D 5/007* (2013.01);
(Continued)

(58) Field of Classification Search
CPC ... A22C 17/00; A22C 17/0006; A22C 17/002; A22C 17/0033; A22C 17/0073; A22C 17/008; A22C 17/0086
(Continued)

(56) References Cited

U.S. PATENT DOCUMENTS

| | | |
|---|---|---|
| 4,758,888 A | 7/1988 | Lapidot |
| 4,875,254 A | 10/1989 | Rudy et al. |

(Continued)

FOREIGN PATENT DOCUMENTS

| | | |
|---|---|---|
| EP | 2531038 A | 12/2012 |
| JP | 2016105084 A | 6/2016 |

(Continued)

*Primary Examiner* — Richard T Price, Jr.
(74) *Attorney, Agent, or Firm* — Christensen O'Connor Johnson Kindness PLLC

(57) ABSTRACT

Workpieces WP are scanned at a scanning station (14) while being transported on a conveyor (12). A control system (18) analyzes the scanning data to develop a three-dimensional model of the workpiece WP and determine how to portion or trim the workpiece as desired. The cutting/trimming paths made through the workpiece is compared with the predetermined cutting paths to quantify the correspondence (or deviance) of the actual cutting paths from the predetermining cutting paths. This information is reviewed to determine whether the system (10) is operating property. If the alignment of the actual cutting/trimming paths with the predetermined cutting/trimming paths are not within a predetermined set point, the control system (18) seeks to determine the cause of the deviation as well as determine what remedial steps to take to restore the alignment of the actual cutting/trimming paths with the predetermined cutting/trimming paths.

21 Claims, 5 Drawing Sheets

(51) Int. Cl.
B26D 5/00 (2006.01)
B26D 5/34 (2006.01)

(52) U.S. Cl.
CPC ........... B26D 5/34 (2013.01); G05B 19/4166 (2013.01); *B26D 2210/04* (2013.01); *G05B 2219/37336* (2013.01); *G05B 2219/37555* (2013.01)

(58) Field of Classification Search
USPC .................................. 452/149, 150, 155–157
See application file for complete search history.

(56) References Cited

U.S. PATENT DOCUMENTS

| | | | |
|---|---|---|---|
| 5,365,186 A | 11/1994 | Ensley | |
| 5,585,603 A | 12/1996 | Vogeley, Jr. | |
| 5,868,056 A | 2/1999 | Pfarr et al. | |
| 5,937,080 A | 8/1999 | Vogeley, Jr. et al. | |
| 6,061,086 A | 5/2000 | Reimer et al. | |
| 6,563,904 B2 | 5/2003 | Wijts et al. | |
| 6,983,678 B2 | 1/2006 | Wattles et al. | |
| 7,153,203 B2* | 12/2006 | Pfarr | B23K 26/0838 452/150 |
| 7,251,537 B1* | 7/2007 | Blaine | A22C 17/0086 452/156 |
| 7,621,806 B2* | 11/2009 | Bottemiller | A22C 17/008 452/150 |
| 7,651,388 B2 | 1/2010 | Faires et al. | |
| 7,918,718 B2* | 4/2011 | Christensen | A22B 5/007 452/157 |
| 9,138,781 B1 | 9/2015 | Strong et al. | |
| 9,778,651 B2 | 10/2017 | Strong et al. | |
| 9,913,483 B2 | 3/2018 | Vuholm et al. | |
| 2009/0087033 A1 | 4/2009 | Chao et al. | |
| 2012/0307013 A1 | 12/2012 | Hjalmarsson et al. | |
| 2014/0012540 A1 | 1/2014 | Jurs et al. | |
| 2017/0108855 A1 | 4/2017 | Rocker et al. | |
| 2018/0027848 A1 | 2/2018 | Blaine et al. | |
| 2018/0029246 A1 | 2/2018 | Blaine et al. | |

FOREIGN PATENT DOCUMENTS

| | | |
|---|---|---|
| KR | 101694434 B1 | 1/2017 |
| WO | 2008016309 A1 | 2/2008 |
| WO | 2016139611 A2 | 9/2016 |

* cited by examiner

PORTIONING ACCURACY ANALYSIS

CROSS-REFERENCE TO RELATED APPLICATION

This application claims the benefit of U.S. Provisional Application No. 62/725,814, filed Aug. 31, 2018, the entire contents of which are expressly incorporated herein by reference.

BACKGROUND

In the portioning of foods, including beef, poultry, fish and other meat products, the food products may have a range of shapes, dimensions and weights. High speed portioning machines and systems are designed to analyze such varied food products and determine how to optimally portion or cut such food products at high production rates, typically over 200 pieces per minute. Accordingly, the difference between correct, intended portioning cuts and incorrect portioning cuts may be subtle and frequent on one hand, or may be dramatic and rare on the other hand. In either situation, the cutting error may be "hidden" among the many thousands of pieces of food products being portioned per hour. Even trained, observant operators, watching for specific problems, for example, too heavy or too lightweight portions, may have difficulty spotting "outliers," especially since the portions pass by on a conveyor belt at a speed of two to three pieces per second. Moreover, inaccuracies in portioning often develop slowly over time, and thus may be difficult for operators to notice.

Further, when portioning machines operate sub-optimally or malfunction on even a small proportion of the workpieces being portioned, the raw material and operating costs resulting can be quite high. Oftentimes, malfunctions for even a small number of workpieces can be indicative of a wider range problem that can quickly develop into a serious problem resulting in down time of the portioning machine to determine and correct the problem. Diagnosing programs with portioning machines may be easier during the operation of the machine than when the machine is non-operational. The present disclosure seeks to provide a system and method for diagnosing problems of portioning machines during the operation thereof.

SUMMARY

An apparatus to acquire and analyze product specific data for food product cutting and trimming includes:

(a) a conveyance system having a transport surface for transporting a stream of separated food products in transport direction;

(b) a scanner for acquiring food product specific physical data as the food products are being transported on the conveyance system;

(c) a control system operably connected to the scanner and designed and configured to receive and analyze the food product specific physical data from the scanner and based on the food product specific physical data, determining how to cut the food products into desired shapes and sizes or determining how to trim the food products as desired, including predetermining the cutting or trimming paths to be used;

(d) a cutter controlled by the control system to cut or trim the food products along the cutting or trimming paths previously determined by the control system as the food products are being transported on the conveyance system;

(e) a vision system operably connected to the control system to capture visually specific data of the food products after cutting or trimming, including the actual cutting or trimming paths traveled by the cutter;

(f) wherein the control system compares the actual cutting or trimming paths with the predetermined cutting or trimming paths and analyzes the extent of alignment of the actual cutting or trimming paths with the predetermined cutting or trimming paths thereby providing an indication of whether the cutter is operating within present physical parameters.

The alignment of the actual cutting or trimming paths with the predetermined cutting or trimming path are not within a predetermined set point, the control system seeks to determine the cause of the deviation.

If the alignment of the actual cutting or trimming paths with the predetermined cutting or trimming paths are not within a predetermined set point, the control system seeks to determine remedial steps to restore the alignment of the actual cutting or trimming paths with the predetermined cutting or trimming paths within the predetermined set point.

The control system selects specific food products from the stream of food products for the vision [optical/camera] system to capture the actual cutting or trimming paths of the cutters or trimmers.

Specific food products are selected from the stream of food products for capture of the actual cutting or trimming paths based on one or more of the following:

(a) physical data of the food products from the scanner;

(b) physical data of the food products and/or the cutting paths captured by the vision [optical/camera] system;

(c) instructions from operational or monitoring personnel; and (d) a sampling program being followed by the control system.

Operational or monitoring personnel selects the individual food products from the stream of food products for capturing the actual cutting or trimming paths (1) after scanning and before cutting or trimming, or (2) after cutting or trimming.

A system for monitoring the operation of a food portioning/trimming system, the food portioning/trimming system including a conveyor system for conveying food products in a stream along a conveying direction, a scanner for scanning the food products to ascertain physical characteristics of the food products, a cutter for portioning/trimming the food products, the monitoring system includes:

a control system receiving data from the scanner pertaining to the physical characteristics of the food products and determining how to portion/trim the food products as desired including predetermining the cutting paths of the cutter;

a vision system operably connected to the control system to capture visually specific data of the food products after portioning or trimming, including the actual cutting paths of the cutter through the food products; and wherein the control system compares the actual cutting paths of the cutter with the predetermined cutting paths to thereby ascertain whether the food product portioning/trimming system is operating within desired parameters.

If the food portioning/trimming system is not operating within desired parameters, the control system seeks to determine potential remedial action needed to restore operation of the food portioning/trimming system within operational parameters.

The control system selects specific food products from the stream of food products and instructs the vision system to capture the actual cutting paths of the cutter of the selected food products.

The selection of the food product from the stream of food products for capture of the actual cutting paths by the vision system is based on one or more of the following:

(a) physical data of the food products from the scanner;

(b) physical data of the food products and/or cutting paths of the cutter captured by the vision system;

(c) instructions from operational or monitoring personnel; and (d) a sampling program being followed by the control system.

The selection of the food product from the stream of food products for capture of the cutting paths by the vision system is made by the operational/monitoring personnel occurs either before or after the portioning/trimming of the selected food product.

A method for cutting or trimming food products, includes:

(a) conveying a stream of individual food products on a conveyance system along a conveyance direction;

(b) scanning the food products for food product specific physical data as the food products are being transported on the conveyance system;

(c) transmitting the food product specific physical data from a scanner to a control system that is designed and configured to receive and analyze the food product specific physical data from the scanner and using such food product physical data to determine how to cut the food product into desired shapes or sizes or how to trim the food product as desired, including predetermining the cutting/trimming paths of the cutters used to cut/trim the food products;

(d) cutting or trimming the food product with cutters controlled by the control system to travel along the cutting/trimming paths previously determined by the control system, as the food products are being transported by the conveyance system;

(e) visually capturing the actual cutting/trimming paths of the cutters through the food products and comparing such actual cutting/trimming paths with the control system predetermined cutting/trimming paths and analyzing the extent of alignment of the actual cutting/trimming paths with the predetermined cutting/trimming paths; and (f) if the extent of alignment of the actual cutting/trimming paths with the predetermined cutting/trimming path is not within a predetermined set point level, seeking to determine the cause of the misalignment.

If needed, taking remedial steps to restore alignment of the actual cutting/trimming paths within a preselected range of alignment with the predetermined cutting or trimming paths.

The control system instructs a vision system to capture the actual cutting/trimming paths of the cutters for selected food products from the stream of food products.

Selecting the food products from the stream of food products for capture of the actual cutting/trimming paths of the cutters/trimmers is based on one or more of the following:

(a) the physical data of the food products from the scanner;

(b) the physical data of the food products and/or the cutting/trimming paths captured by the vision system;

(c) instructions from operational or monitoring personnel; and (d) a sampling program being followed by the control systems.

The selection by operational/monitoring personnel occurs either before or after cutting/trimming of the food product.

A method for monitoring the operation of a food product portioning/trimming system, the food product portioning/trimming system includes: a conveyor system for conveying a stream of individual food products in a conveyance direction; a scanner for scanning the food products to ascertain physical parameters of the food products; at least one cutter for portioning/trimming the food products; and a control system for receiving data from the scanner pertaining to the physical parameters of the food products and determining how to portion/trim the food products including predetermining the cutting paths of the at least one cutter, the method comprising:

visually capturing the actual cutting paths of the at least one cutter from the stream of food products; and comparing the extent of alignment of the actual cutting paths of the at least one cutter with the predetermined cutting paths of the at least one cutter to thereby ascertain whether the food portioning/trimming system is operating within desired parameters.

If the alignment of the actual cutting paths is not within a predetermined set point with respect to the predetermined cutting paths, investigating the cause of the misalignment.

Capturing visually related data for selected food products after cutting.

Selecting specific food products for visually capturing the actual cutting paths of the specific food products is based on one or more of the following:

(a) the physical data of the food products from the scanner;

(b) the physical data of the food products and/or cutting paths captured by a vision [optical/camera] system;

(c) instructions from operational or monitoring personnel; and (d) a sampling program followed by the control system.

The selection of specific food products for visually capturing the actual cutting paths of the specific food products made by operational or monitoring personnel occurs either before or after the portioning/trimming of the food products.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
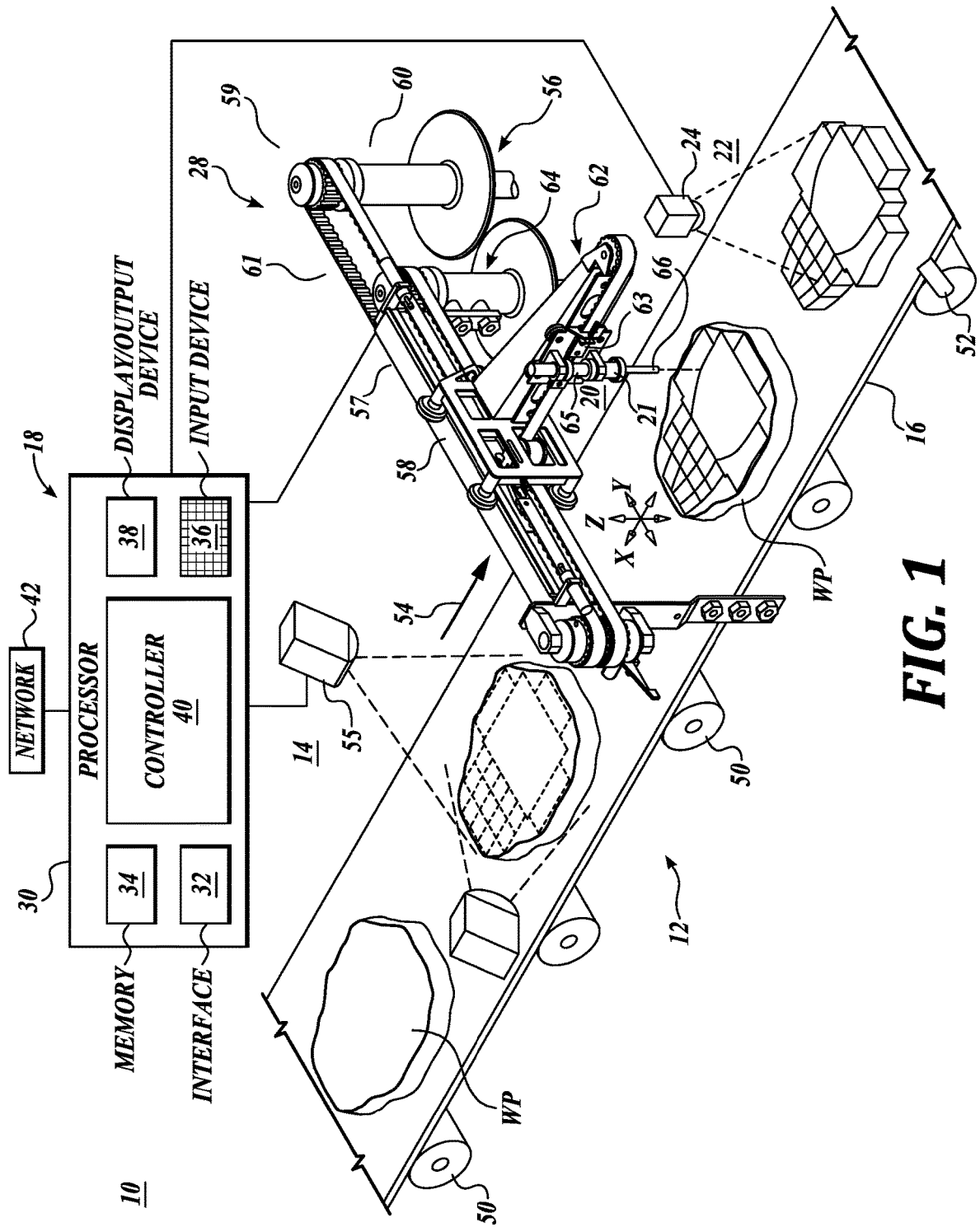
FIG. 1 is a schematic representation of an apparatus and system for processing workpieces, including food products, according to the present disclosure.

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below" "top" "bottom" "right hand" "left hand" "in" "out" "extended" "advanced" "retracted," "proximal," and "distal." These references and other similar references in the present application are only to assist in helping describe and understand the present disclosure and are not intended to limit the present invention to these directions.

The present application may include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out.

In the following description, various embodiments of the present disclosure are described. In the following description and in the accompanying drawings, the corresponding systems, assemblies, apparatus, units and parts may be identified by the same part number, but with an alpha suffix. The descriptions of the parts/components of such systems, assemblies, apparatus, and units that are the same or similar are not repeated so as to avoid redundancy in the present application.

In the present application and claims, references to "food," "food products," "food pieces," and "food items," are used interchangeably and are meant to include all manner of foods. Such foods may include meat, fish, poultry, fruits, vegetables, nuts, or other types of foods. Also, the present systems and methods are directed to raw food products, as well as partially and/or fully processed or cooked food products.

Further, the system, apparatus and methods disclosed in the present application and defined in the present claims, though specifically applicable to food products or food items, may also be used outside of the food area. Accordingly, the present application and claims may reference "work products" and "workpieces," which terms are synonymous with each other. It is to be understood that references to workpieces and workpieces also include food, food products, food pieces, and food items.

The system and method of the present disclosure include the scanning of workpieces, including food items, to ascertain physical parameters or characteristics of the workpiece, including the size and/or shape of the workpiece. Such size and/or shape parameters/characteristics may include, among other physical parameters/characteristics, the length, width, aspect ratio, thickness, thickness profile, contour, outer contour, outer taper, flatness, outer perimeter, outer perimeter configuration, outer perimeter size, outer perimeter shape, volume and/or weight of the workpiece. With respect to such physical parameters, including the length, width, length/width aspect ratio, and thickness of the workpieces, including food items, such physical parameters may include the maximum, average, mean, and/or medium values of such parameters. With respect to the thickness profile of the workpiece, such profile can be along the length of the workpiece, across the width of the workpiece, as well as both across/along the width and length of the workpiece.

As noted above, a parameter or characteristic of the workpiece that may be ascertained, measured, analyzed, etc., is the contour of the workpiece. The term contour may refer to the outline, shape, and/or form of the workpiece, whether at the top surface or the base or bottom of the workpiece or at any height along the thickness of the workpiece. The parameter term "outer contour" may refer to the outline, shape, form, etc., of the workpiece along its outermost boundary or edge.

The parameter referred to as the "perimeter" of the workpiece refers to the boundary or distance around a workpiece. Thus, the terms outer perimeter, outer perimeter configuration, outer perimeter size, and outer perimeter shape pertain to the distance around, the configuration, the size and the shape of the outermost boundary or edge of the workpiece.

The foregoing enumerated size and/or shape parameters/characteristics are not intended to be limiting or inclusive. Other size and/or shape parameters/characteristics may be ascertained, monitored, measured, etc., by the present systems and methods. Moreover, the definitions or explanations of the above specific size and/or shape parameters/characteristics discussed above are not meant to be limiting or inclusive.

A first embodiment of a processing system 10 is illustrated in FIG. 1 as including a conveyor 12 for carrying individual workpieces WP, such as food products, in a stream, past a scanning station 14 while being transported on a conveyor belt 16. The workpieces WP are inspected at scanning station 14 to ascertain physical parameters/characteristics of workpieces WP, pertaining to, for example, size and/or shape of the workpieces. Such parameters/characteristics may include, for example, the length, width, length/width aspect ratio, thickness, thickness profile, contour, outer contour configuration, outer taper, flatness, outer perimeter configuration, outer perimeter size and shape, volume and/or weight, as well as whether the workpieces contain any undesirable materials, such as bones, fat, cartilage, metal, glass, plastic, etc., and the location of the undesirable materials in the workpieces. The results of the scanning occurring at station 14 are transmitted to a control system 18.

At the processing station, the data from the scanning station 14 is analyzed to develop a three-dimensional model of the workpiece WP and also determine how to cut the workpiece into desired portions and/or trim the workpiece into a desired overall shape. This analysis includes determining the cutting paths through the workpiece to be traveled by a cutting apparatus 21 located at a cutting station 20 downstream from the scanning station 14. The workpiece is portioned/trimmed by the cutting apparatus 20 as the workpiece is being carried along in the conveyance direction 54 by conveyor 12.

Next, thereafter the workpiece is carried past a vision station 22 utilizing an optical camera 24 or other optical apparatus for imaging the workpiece after portioning or trimming, including the cutting paths traveled by the cutter 21 at the cutting station 20. The data from the optical camera 24 is used to compare the actual cutting or trimming paths with the predetermined cutting of trimming paths (from the scanning data) thereby to determine the variance between the actual cutting/trimming paths and the predetermined cutting/trimming paths. In this regard, control system 18 analyzes the data from the vision station 22 to confirm that the workpiece depicted at the vision station is the same as the workpiece previously scanned at the scanning station 14. Once this identity is confirmed, then if there has been any significant movement or shifting of the workpiece from the time that the workpiece was scanned at scanning station 14 to the time that the portioned/trimmed workpiece is viewed at vision station 22, or if any significant distortion of the shape of the workpiece has occurred, the applicable information or data from the scanning station 14 is translated (also referred to as "transformed") by the control system 18 onto the corresponding data generated by the vision system 24. Such translation may include one or more of: shifting the workpiece in the X and/or Y direction, rotating the workpiece, scaling the size of the workpiece, and correcting for shear distortion of the workpiece, as more fully disclosed below.

Thereafter, the actual cutting/trimming paths made through the workpiece WP is compared with the predetermined cutting paths to quantify the correspondence (or deviance) of the actual cutting paths from the predetermined cutting paths. This information provides an indication of whether the system 10 is operating properly, including whether the cutting system 20 is functioning within desired parameters. If the alignment of the actual cutting/trimming paths with the predetermined cutting/trimming paths are not within a predetermined set point, the control system 18 seeks to determine the cause of the deviation as well as seeks to determine what remedial steps to take to restore the alignment of the actual cutting or trimming paths with the predetermined cutting or trimming paths.

It will be appreciated that if the vision system focused on whether the actual shapes cut from the workpiece match the predetermined shapes, it may be that such shapes were cut from locations on the workpiece other than as desired. Accordingly, the cut shapes may not be of the thickness or weight expected since the location from which the portions were cut may be of a different thickness than the expected location based on the scanning data. However, if the focus is on the accuracy of the actual cut paths through the workpiece, then the resulting portions will be cut from the expected locations on the workpiece and thus achieve the thickness, weight or other parameter(s) or characteristic(s) desired of the portioned workpieces.

Not all of the workpieces WP need to be analyzed with respect to whether the predetermined cutting/trimming paths are correctly followed by the cutter. The endeavor is to determine whether or not the system 10 is operating properly, including whether the cutting/trimming paths have been properly preprogrammed. The control system 18 can be programmed to select workpieces for analysis based on the data from a scanning system 14 and/or data from the optical system 22 as discussed more fully below. In addition, workpieces selected for analysis may be based on observation of the workpieces by personnel that are operating or monitoring the system 10. Such personnel may be at the location of the system 10 or at a remote location. Also, the workpieces may be analyzed based on the random sampling of the cut portions.

Next, describing the foregoing components and aspects of the processing system 10 in more detail, as schematically shown in FIG. 1, control system 18 includes a processor 30 and an interface 32 therefor for receiving signals and information from the scanning station 14 and the optical station 22, as well as other data sources of system 10, as described more fully below. A memory unit 34 is provided for storing information regarding the processing system 10. A keyboard or other input device 36 is provided to enable an operator to communicate with the control system 18. Also, a display or other output device 38 is provided to convey information from the processing system to the operator, including the functioning of the system 10 and the results of analyzing the actual cutting path taken by cutter 21 when portioning and/or trimming the workpiece WP. The control system also includes a controller 40 which may be in the form of a programmable logic controller or other type of controller, for controlling the operation of the system 10, including conveyor 12, scanning station 14, cutting station 20, and vision station 22. The control system 18 can be connected to a network 42. Also, rather than employing a local control system 18, a network computing system can be used for this purpose.

Still referring to FIG. 1, conveyor 12 carries individual workpieces WP in a stream beneath scanning station 14, then beneath cutting station 20 and thereafter beneath vision station 22. The conveyor 12 includes a powered belt 16 which is supported by a series of rollers 50 to train around end rollers, not shown, one of which is the drive roller, which drives the belt 16 in a standard manner. An encoder 52 is employed with respect to one of the support rollers 50 or an end roller for use to determine the position of the workpiece WP on the conveyor belt as well as the progress or movement of the workpiece along the conveyance direction 54. Although a single belt 16 is shown, the conveyor system 12 may be composed of one or more belts, for instance, a flat, solid belt may support the workpiece during scanning at station 14. Such belts are typically flat, non-metallic belts. The workpiece can be transferred from the first belt to the second belt which supports the workpiece during the portioning or trimming process at station 20. If a waterjet cutter 21 is used to portion or trim the workpiece, it is advantageous to utilize an open mesh, metallic belt to allow the waterjet to pass downwardly therethrough, and also so that the belt is of sufficient structural integrity to withstand the impact thereon from the waterjet. Such metallic, open mesh belts are articles of commerce.

The scanning system 14 may be a variety of different types, including a video camera (not shown) to view a workpiece WP illuminated by one or more light sources 60. Light from the light source 55 is extended across the moving conveyor belt 16 to define a sharp shadow or light stripe line, with the area forwardly of the transverse beam being dark. When no workpiece WP is being carried by the conveyor 12, the shadow line/light stripe forms a straight line across the conveyor belt 16. However, when a workpiece WP passes across the shadow line/light stripe, the upper, irregular surface of the workpiece produces an irregular shadow line/light stripe as viewed by a video camera (not shown) directed diagonally downwardly on the workpiece and the shadow line/light stripe. The video camera detects the displacement of the shadow line/light stripe from the position it would occupy if no workpiece were present on the conveyor belt. This displacement represents the thickness of the workpiece along the shadow line/light stripe.

The length of the workpiece is determined by the distance of the belt travel that shadow line/light stripes are created by the workpiece. In this regard, the encoder 52, integrated into the conveyor 12, generates pulses at fixed distance intervals corresponding to the forward movement of the conveyor.

In lieu of a video camera, the scanning station may instead utilize an x-ray apparatus (not shown) for determining the physical characteristics of the workpiece, including its shape, mass, and weight. X-rays may be passed through the object in the direction of an x-ray detector (not shown). Such x-rays are attenuated by the workpiece in proportion to the mass thereof. The x-ray detector is capable of measuring the intensity of the x-rays received thereby, after passing through the workpiece. This information is utilized to determine physical parameters pertaining to the size and/or shape of the workpiece, including for example, the length, width, aspect ratio, thickness, thickness profile, contour, outer contour configuration, perimeter, outer perimeter configuration, outer perimeter size and/or shape, volume and/or weight, as well as other aspects of the physical parameters/characteristics of the workpiece. With respect to the outer perimeter configuration of the workpiece WP, the X-ray detector system can determine locations along the outer perimeter of the workpiece based on an X-Y coordinate system or other coordinate system. An example of such an x ray scanning device is disclosed in U.S. Pat. No. 5,585,603, incorporated by reference herein.

The foregoing scanning systems are known in the art and, thus, are not novel per se. However, the use of these scanning systems in conjunction with the other aspects of the described embodiments of the present disclosure is believed to be new.

Various types of cutting devices may be utilized at cutting station 20. One type of cutter that may be used is the high pressure waterjet cutter 21. Such cutters are disclosed in U.S. Pat. Nos. 4,875,254, 5,365,186, and 5,868,056, all incorporated herein by reference. As schematically shown in FIG. 1, the waterjet cutter includes a nozzle that may be moved relative to the conveyor 12 both longitudinally of the conveyor and laterally of the conveyor, as well as vertically relative to the conveyor surface. This enables the waterjet cutter 21 to portion/trim the workpiece so as to achieve a desired shape or harvest desired portions from other types of cutting devices that may be utilized including band saws, reciprocating saws, circular saws, guillotine knives and lasers. If the workpieces are to be portioned, they can be cut into desired portion sizes, portion weights, portion shapes, portion thicknesses, maximum fat content, or other parameters by using these same cutting devices.

FIG. 1 illustrates one particular cutting apparatus 56 that may be utilized in conjunction with the waterjet cutter 21. The apparatus 56 in basic form includes a support structure 57 extending across the conveyor 12 for supporting and guiding a first carriage 58 for movement transversely to the direction of movement 54 of the conveyor 12. The carriage 58 is powered by a drive system 59 including, in part, a motive system 60 and a drive train 61. A second, longitudinal support structure 62 is cantilevered outwardly from carriage 58 in a direction generally aligned with the direction of movement 54 of the conveyor 12. A second longitudinal carriage 63 is adapted to move along longitudinal support structure 62 by the drive system 59. In this regard, a second motive system 64 powers the longitudinal carriage 63 through the drive train 61.

The high-speed waterjet nozzle assembly 21 is mounted on the longitudinal carriage 63 to move therewith as the nozzle operates on (cuts) the underlying workpiece WP being carried by the conveyor 12. The nozzle assembly 21 includes a body portion 65 that is secured to the carriage 63. The nozzle assembly 21 also includes a lower outlet tip 66 directed downwardly towards conveyor belt 16. High-pressure liquid nozzle assemblies of the type of nozzle assembly 21 are articles of commerce. High-pressure water is supplied to nozzle assembly 21 by supply lines, not shown, in a manner well-known in the art.

In operation, as workpieces WP are carried along conveyor 12, the nozzle assembly 21 is moved along selected paths of travel by carriages 58 and 63 powered by drive system 59. Carriage 58 moves the nozzle assembly 21 transversely, and carriage 63 moves the nozzle assembly longitudinally relative to the direction of travel of the conveyor 12. This enables the nozzle assembly 21 to travel quickly along routes which are programmed into the operation of the servo motors of the motive systems 60 and 64 by control system 18.

Other types of cutting devices that may be utilized including band saws, reciprocating saws, circular saws, guillotine knives and lasers. If the workpieces are to be portioned, they can be cut into desired portion sizes, portion weights, portion shapes, portion thicknesses, maximum fat content, or other parameters by using these same cutting devices.

The camera 24 of vision station 22 may be of various types, for example, a simple optical camera, such as a grayscale camera, can be used to acquire a complete image (photo) of the portioned/trimmed workpiece, including the paths through the workpiece traveled by the cutter. However, an enhanced definition of the workpiece can be obtained by more sophisticated cameras, such as a multi-spectral or high-spectral camera. Such cameras, in addition to being able to capture the outer contour of the workpiece, are also able to visually acquire undesirable regions of the workpiece, such as blood spots, streaks or fat, or the like. Other types of cameras that may be employed include RGB cameras and infrared or ultraviolet cameras. Further, the cameras may capture still images or videos of the workpiece, including the cutter paths through the workpiece.

Image processing functions may occur at the camera 24 or at the control system 18. Such image processing can be aided by artificial intelligence tools, including image recognition software, which in turn is aided by machine learning. Feedback from machine learning could be input at the machine level by the operator at the location of the system 10 or by personnel at remote locations. Such input may include not only the type of food product being portioned and trimmed, but also particular shapes or features of the workpieces being portioned or trimmed by the system 10.

Image processing may also include adjusting the lightness, brightness, color or other parameters. Image processing may also include more specialized adjustments directed towards locating and identifying cut lines made by the waterjet or other type of cutting device. Such cut lines may be digitally highlighted or enhanced for easier viewing of such cut lines. The final image that is created of the workpiece may be stored at the control system 18 or at a central location to broaden accessibility to the stored image. Also, the image may be stored in its final processed state or in its raw data state, or both.

The information/data from the scanning station 14 and vision station 22 is analyzed by the control system 18 to determine how closely the cutting paths traveled by the cutter 21 through the workpiece matches the previously determined cutting paths. The processor is able to quantify how closely the actual cutting paths match the predetermined cutting paths. If the actual cutting paths are not within a predetermined set point of the expected or intended cutting paths, a problem with the operation of the system 10 may be indicated. Such problem may lie in the functioning or operation of the components of the system 10, or may lie in the improper set up of the system 10, including the programming of the cutting system 20.

For example, an increasingly bad bearing in one cutter can reduce the accuracy that is detectible only on certain cuts, resulting in cutting paths that do not meet or intersect as expected. As such, the final portion may not be completely cut from the initial workpiece. This problem may be intermittent, and not significant enough to shut down the system. However, to the operators the incomplete cuts may be of unknown origin, and the problem may grow slowly over time as the bearing continues to wear.

Alternatively, this problem could become acutely serious with a change of raw food products to be portioned or a change in cut paths due to a different type of food product to be cut. By using the system 10, the incomplete cuts can be identified and compared with the original cut paths precalculated based on the data from scanning system 14. As a result, the affected cutter can be easily identified. Moreover, the software which controls the cutter 20 can be reconfigured (on the fly) to stop cutting the workpiece using the cutter with the bad bearing until there is sufficient scheduled down time to preform repair or maintenance on the cutter.

Another situation which can occur in portioning and trimming operations is that the cut performed is highly irregular in shape. The system 10 allows for a comparison between the finished cut shape and the intended cut shape and shows them to match them very closely. This indicates that the irregular shape is the result of an incorrect set up of the cut program that may be invoked only in rare instances when the raw, uncut workpiece is an "outlier," for instance, when the workpiece is of a weight, height, etc., that is at the upper or lower end of the acceptable range for the parameter involved. Nonetheless, the system 10 can diagnose the source of the problem so that a correction can be made.

As another example, the cutting software attempts to keep the cuts made within the cut envelope, but when cuts occur near the edges or limit of the cutter travel capabilities, it may be difficult to maintain the cut within the desired cut envelope due to mechanical constraints on the cutting apparatus. For example, the cutter 21 may hit a stop causing the cutter to tilt momentarily. The vision system 22 is capable of tracking the location of the cutter and could capture images of the cut/trimmed portions when the cutter is at the far end of its motion ranges to determine if these "outlier" cutting conditions are causing inaccuracies. An example would be incomplete cut results from a cutter that is stressed and pulled to a non-vertical due to the cut occurring at the far edges of the cut envelope.

Other problems or conditions that may be ascertained by use of system 10 include, for example, if a cutter, such as cutter 21 is out of position or if the nozzle of the cutter is not operating properly. Other conditions that may be diagnosed include a bent or otherwise damaged component of the support structure 57 of the cutting apparatus 56. A further condition that can be identified is when the nozzle tip 66 becomes worn out and thus expels a high pressure waterjet along with a path width that is substantially larger than normal. As noted above, another condition that can be identified by the present system is the incorrect programming of the movement of the cutting apparatus 56. These examples are not intended to be inclusive but merely illustrative of the various conditions of the system 10 that may be monitored the system 10.

Figure 2:
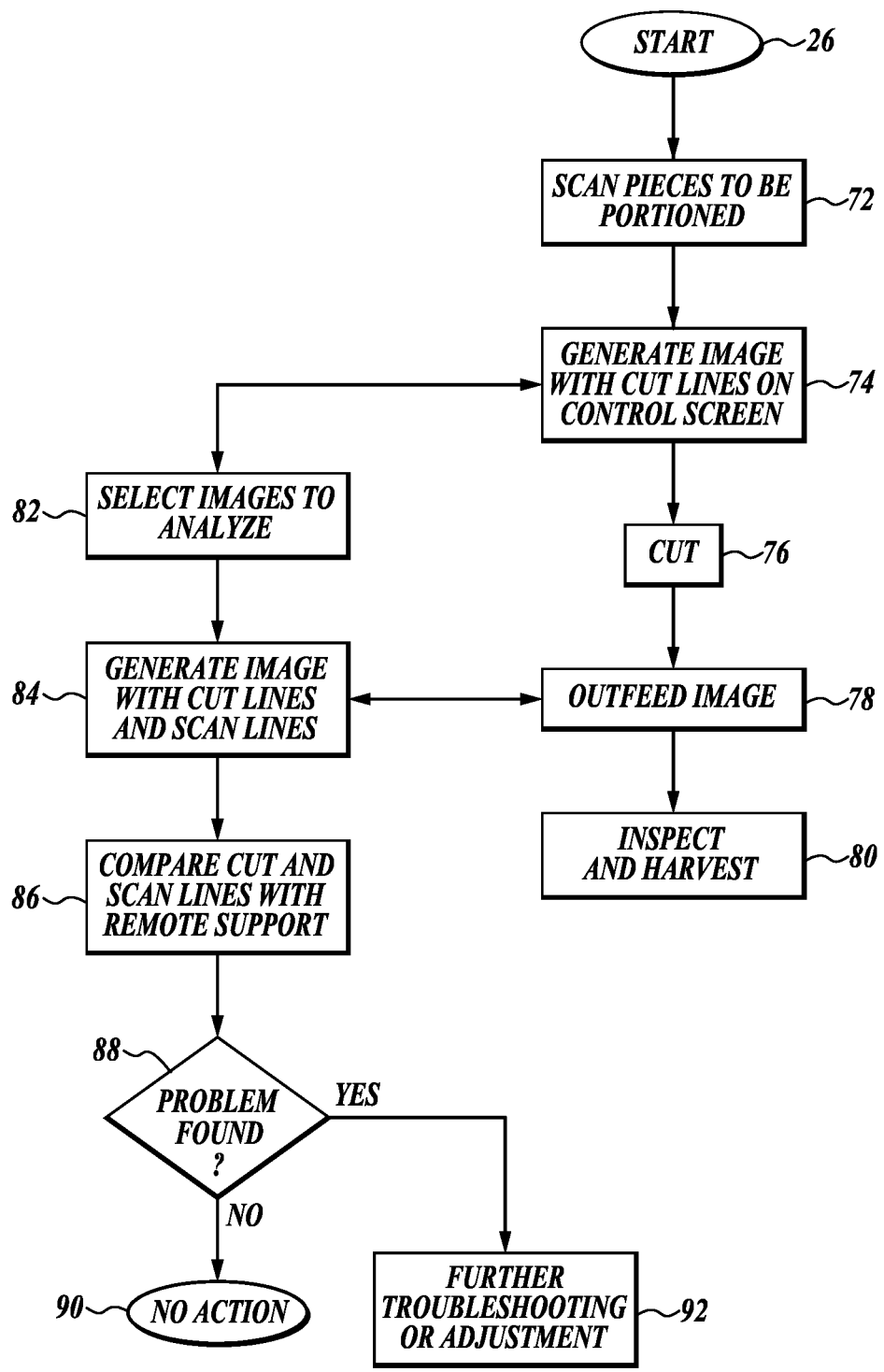
FIG. 2 is a flow diagram of a workpiece processing method utilizing the system and apparatus of FIG. 1.

FIG. 2 is a flow diagram illustrating an overall process using the system 10 of the present disclosure. The method starts at step 70, and includes the step 72 of scanning the workpiece which is to be portioned or trimmed. In the scanning step, information or data concerning the physical parameters/characteristics of the workpiece is obtained, including with respect to the shape, size and location of the workpiece on the conveyor. Such characteristics or parameters may include, for example, the length, width, thickness, thickness profile, contour, outer or exterior contour profile, perimeter, outer perimeter configuration, outer perimeter size, outer perimeter shape, volume and/or weight of the workpiece as well as discontinuities on the workpiece, including depressions or concavities and contours in the outer shape or surface of the workpiece. The scanning may also provide information or data with respect to the location of fat, gristle, tears, or other undesirable features or aspects of the workpiece.

The information or data from the scanning step 72 is transmitted to the control system 18, wherein such data or information is employed to generate a three-dimensional model of the workpiece as well as to determine how the workpiece should be portioned into desirable end pieces or how the workpiece should be trimmed into a desirable overall shape and/or to remove fat or other undesirable features of the workpiece, step 74. The processing system determines the cutting paths to be traveled by the cutting device to portion or trim the workpiece as determined.

Thereafter, the workpiece is cut at cutting station 20, presumably with the cutter 21 following the predetermined cutting paths, step 76.

Next, at step 78, an optical image of the trimmed/portioned workpiece is captured at vision station 22 using a camera 24. As discussed above, the image of the portioned/trimmed workpiece not only includes the shapes of the portioned end pieces but also the cut lines or paths traveled by the cutter during cutting. As discussed more fully below, it may not be necessary to capture an image of each of the workpieces at the vision station, but rather only the workpieces of interest. Alternatively, at step 78 each of the workpieces is imaged, but then the image is not retained unless a decision is made to analyze a specific workpiece.

Next, in a normal course, at step 78, the portioned/cut workpiece may be manually or automatically inspected and then the workpiece transferred on for further processing, for example, cooking, freezing, packaging, etc.

Typically, the system 10 is not intended to analyze each workpiece being processed, but rather to analyze specific workpieces. The selection of workpieces to be analyzed can be performed manually or automatically based on the scanning results at scanning station 14. For example, the scanning results may indicate that the workpiece is especially large or small, or especially thick or thin or has an odd shape or exhibits other physical characteristics or features that vary significantly from the norm. The processor may flag that particular workpiece for analysis, step 82. In addition or alternatively, workpieces may be identified for analysis by system operators at the location of the system or at a remote location that are viewing the operation of the system 10. Such local or remote operators or monitors may notice physical parameters or features of the workpiece even before scanning or based on the scanning results. Such monitors or operators may "flag" a particular workpiece for analysis, step 82.

In addition, other events may trigger the analysis of workpieces being processed by system 10. One example would include a detected reduction in water or air pressure to the system 10, which may affect the operation of the system 10, including a cutter 21. Another situation that may initiate analysis of workpieces is a surge in the conveyor belt speed as detected by the control system 18 and belt encoder 52. Other, even more "routine" circumstances that may lead to analysis of the workpieces are a change in the raw material being trimmed or portioned, a change in the belt speed, a change in the cutting program used to portion the workpieces, or simply during start up of a production run or at the beginning of the work shift.

If a decision is made at step 82 either automatically via control system 18 or manually via local or remote personnel, the system 10 instructs the vision system 22 to capture an image of the portioned/trimmed workpiece, step 84, which may also be referred herein as the "outfeed image." As discussed above, the outfeed image may be processed or enhanced by adjusting for lightness, brightness, color, or other traditional approaches. In addition, the background may be eliminated, for example, the conveyor belt so that the workpiece can be viewed more clearly. The processed/enhanced image seeks to clearly show the cut paths or lines traveled by the cutter 21.

When a decision is made to analyze a particular workpiece, the system keeps track of the selected workpiece by use of the encoder 52 which can be used to track the movement of the workpiece in the travel direction 54 so that when the workpiece arrives at vision system 22, an image of the portioned and/or trimmed workpiece can be obtained.

The system 10 can also verify that the workpiece being imaged at vision station 22 is the same workpiece that was selected for analysis by comparing data with respect to the workpiece obtained at the scanning station 14. For example, at the scanning station, discrete locations along the outer perimeter of the workpiece ben can be mapped onto an X-Y coordinate system or other coordinate system. Then, later at the vision station 22, the coordinate locations of the same outer perimeter of the workpiece can be determined and the processor system can compare such coordinate data. If the data sets a match within a fixed threshold level, then confirmation is provided that the workpiece imaged at vision station 22 is the same as the workpiece previously scanned at scanning station 14.

Figure 6:
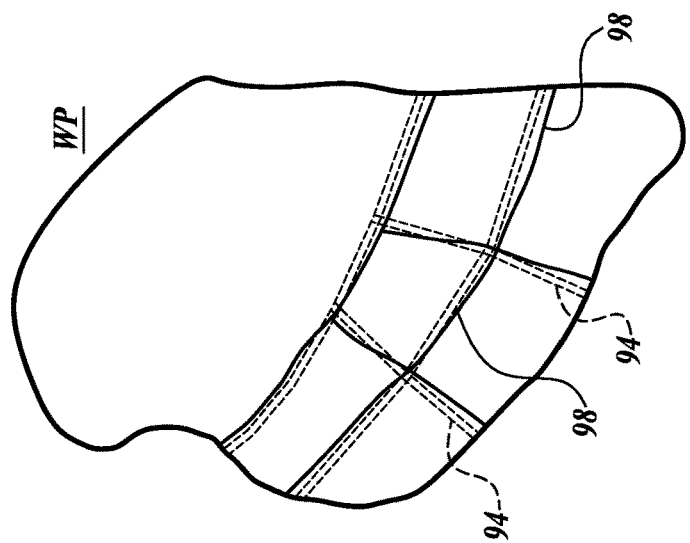
FIG. 6 is a view similar to FIG. 5 illustrating another example of the actual cut lines through the workpiece overlaid on the predetermined cut lines.
Figure 5:
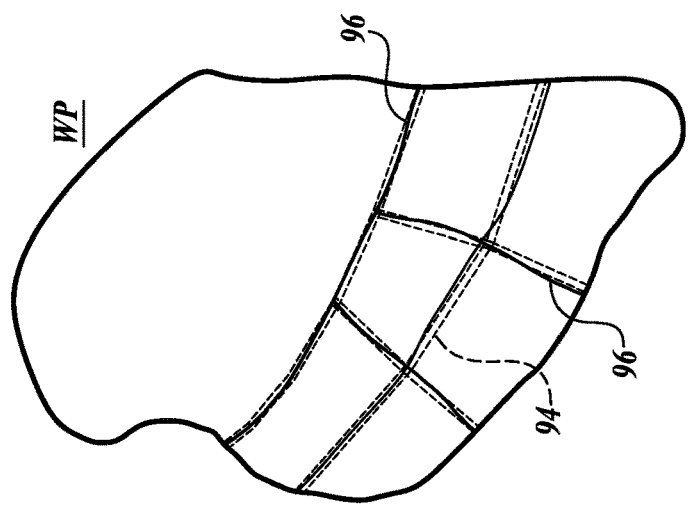
FIG. 5 illustrates the workpiece in FIG. 4 wherein the actual cut lines are overlaid on the predetermined cut lines.
Figure 4:
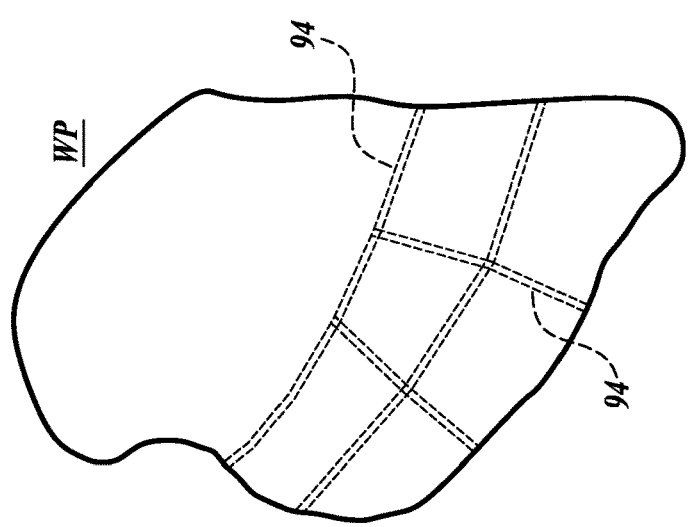
FIG. 4 is a schematic view of a workpiece wherein predetermined cut lines for portioning the workpiece are shown overlaid on the workpiece.

Next, at step 86 a quantitative comparison is performed to determine how closely the actual cut lines coincide with the predetermined cutting paths that were based on the scanning data. In one analysis technique, the actual cut lines are superimposed over the calculated scan generated cutting paths. The extent of matching or mismatching between the actual cutting lines and the calculated cutting lines may be quantified. In one such technique, as shown in FIGS. 4, 5, and 6, the calculated cutting paths 94 may be given or assigned a particular width, which is wider than a typical actual cut line. The actual cut line 96 is superimposed over this widened precalculated cutting path. A determination can be made to the percentage of the overall path length that the actual cutting line 96 stays within the widened predetermined cutting path 94. A set point for an acceptable portion of the cutting path length that the actual cutting path is outside of the width of the calculated cutting path can be determined. As such, if the actual cutting path 96 remains below this set point, then the system is deemed to be operating properly, see FIG. 5. However, if the percentage of the length of the actual cutting path that deviates from the widened cutting path is above the set point level, then the system is deemed to be not operating properly, see FIG. 6. As such, the system itself and/or the operating personnel seek to determine the cause of the unacceptable deviation. Several such potential reasons for the unacceptable deviation have been described above, including component damage or failure or using an incorrect or improper cutting program. As also discussed above, the determination of the cause or reason for the improper operation of the system 10 may be facilitated by analyzing or reviewing the location or frequency or other aspect(s) of the deviation of the cutting path from the predetermined cutting path.

The analysis of the extent to which the actual cutting paths follow the predetermined cutting paths may also take into consideration not only the proportion of the length of the actual cutting path that strays beyond the widened calculated cutting path, but also the distance that the actual cutting path deviates laterally from the calculated cutting path may be taken into consideration. A multi-factor analysis algorithm can be utilized to analyze not only the proportion of the length of the actual cutting path extends laterally of the calculated cutting path, but also the extent of lateral deviation of the actual cutting path from the calculated cutting path.

The accuracy of the foregoing overlaying analysis technique is dependent on an accurate overlay of the actual cutting paths with the predetermined cutting paths. However, it is possible that the workpiece has shifted in the X and/or Y direction or rotated about the Z direction during travel on the belt 16, for example, due to the cutting action of the waterjet cutter on the workpiece. It is also possible that the workpiece has increased or decreased in length or width or otherwise distorted in shape between scanning station 14 and vision station 22. Such distortion in the shape of the workpiece or movement of the workpiece on the belt 16 can be determined by comparing the scanning data from scanning station 14 with the data from vision system 22.

Figure 7A:
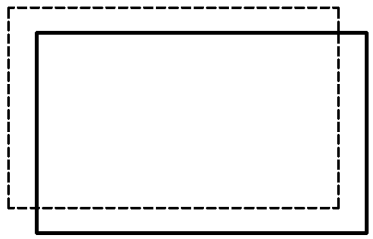
FIGS. 7A-7F schematically illustrate the manner in which workpieces may shift, move or distort at the cutting station or otherwise during the processing of the workpiece.

If shifting or distorting of the workpiece occurred in the X and/or Y directions, then the control system 18 can translate or manipulate the image of the workpiece from the scanning station to the optically determined image of the workpiece so as to improve the match of the shapes or outlines of the workpieces. This translation is schematically illustrated in FIG. 7A, wherein the workpiece as scanned at the scanning station 14 is shown in broken line and the workpiece as scanned at the optical station 22 is shown in solid line. The control system 18 translates the broken line image onto the optical image shown in solid line in FIG. 7A.

Figure 7B:
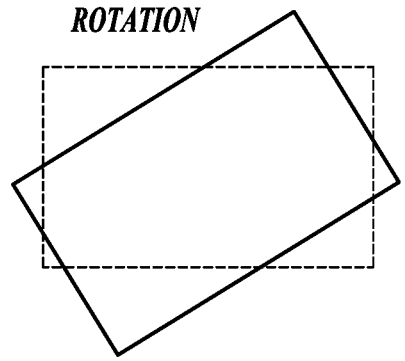

As noted above, the workpiece WP may also rotate when the workpiece is portioned or cut. This is schematically shown in FIG. 7B, wherein the workpiece as scanned by the scanning station 14 is shown in broken line, whereas the workpiece as scanned by the optical station is shown in solid line. So that the actual cut lines are accurately overlaid over the calculated cut lines, the outline of the workpiece including the calculated cut lines from the scanner 14 is transformed onto the image data from the optical scanning station 22.

Figure 7C:
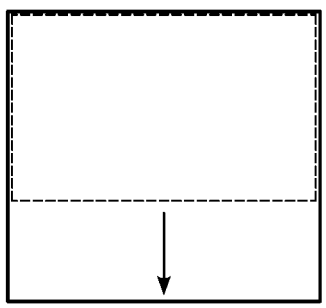
Figure 7D:
Figure 7E:
Figure 7F:
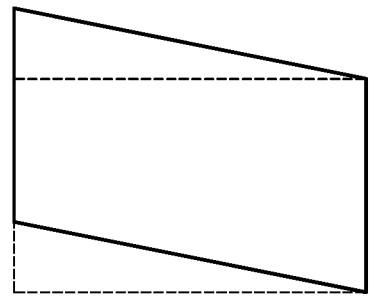

Further distortion of the workpiece may occur that increases or decreases in scale (within) the Y direction (across belt 16) and/or length in the X direction (along belt 16) as shown in FIGS. 7C and 7D. Another form of distortion can occur in the workpiece is a distortion in shear in the X direction, as shown in FIG. 7E, or in the Y direction as shown in FIG. 7F. These additional potential distortions can be accommodated by transforming the data from the scanning station 14 onto the workpiece as imaged in the vision station 22. The foregoing transformations can be performed using well known techniques.

It will be appreciated that performing the foregoing transformation will increase the accuracy of the analysis of the extent to which the actual cutting paths of the cutter 21 matches the predetermined cutting path based on the scanning data.

Figure 3:
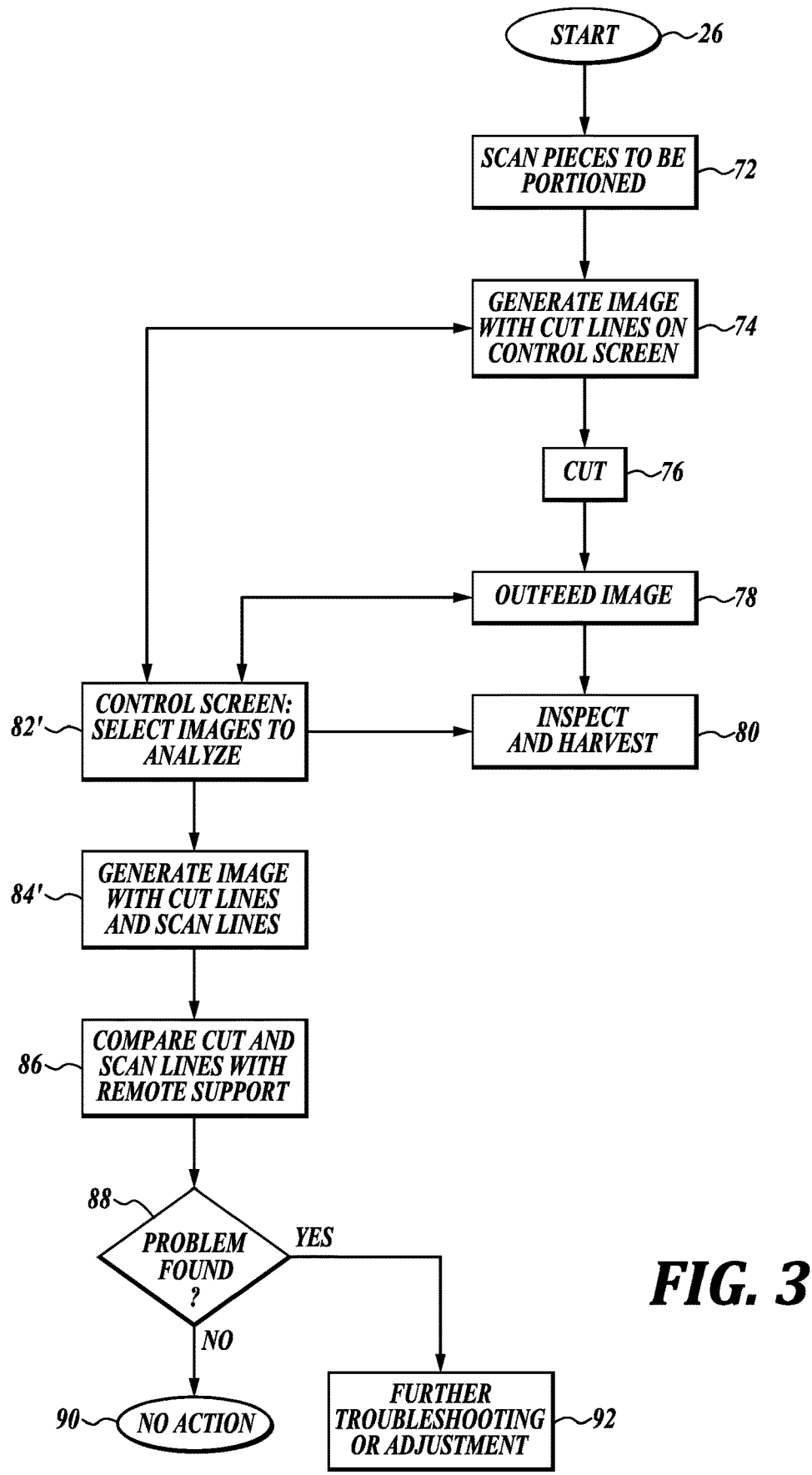
FIG. 3 is a flow diagram of a further workpiece processing method utilizing the system and apparatus of FIG. 1.

FIG. 3 illustrates a further process carried out utilizing the system 10 of the present disclosure. The steps of the method of FIG. 3 that are the same or essentially the same as in FIG. 2 have been identified by the same designation number. Moreover, the description of the particular steps will not be repeated. A main difference between the process or method of FIG. 2 from that of FIG. 3 is that workpieces to be analyzed are identified after the workpiece has been portioned or cut at step 76. The identification of the workpieces to be analyzed can originate from the control system 18 based on the preprogramming of the processor to look for workpieces of specific post portioning or trimming anomalies or attributes, for example, if cutting lines do not intersect as preprogrammed so that portions are not cleanly separated from each other or from the trim of the workpiece. As another example, the vision station may detect that the shape of the portions cut from the workpiece are at significant variance from the expected shape of the workpiece. It will be appreciated that these conditions may also be observed by system operators or monitors whether such personnel are local at the system 10 or at a remote location.

To accommodate the situation in which a decision is made after the portioning or trimming of the workpiece to analyze the workpiece, if this decision occurs after the workpiece has passed the vision station, the system can be configured to image each of the workpieces post portioning or cutting and retain such images for a fixed length of time, which can be relatively short, no more than a few minutes. If no decision has been made to analyze the portioned/trimmed workpiece, then the image of the portioned/trimmed workpiece is automatically deleted.

As a further matter, it will be necessary to obtain the scanned image of the applicable workpiece as well as the determined/calculated cutting paths based on the scanning data. The scanning data for each workpiece is also retained for a certain length of time and then automatically deleted. However, if a particular workpiece is desired to be analyzed based on a decision made after portioning/cutting, the control system 18 as discussed above is able to select the proper scanning data for the selected workpiece for use in the comparison analysis of the calculated cutting paths with the actual cutting paths. The comparison of the actual cutting paths with the calculated cutting paths occurs at step 86 and then at step 88 if the actual cutting path is found to be within the set point of deviation from the calculated cutting path, no action is taken. However, if the actual cutting path is below the set point, then attempts are made to determine the cause of the deviation and also what remedial actions or steps are needed to correct the deviation, see step 92.

It will be appreciated that the process of the present disclosure can be performed remotely by skilled personnel having intimate knowledge of the system 10, including the proper operation of the cutter 21. The remotely located personnel are able to view the operation of the system 10, as well as manipulate the images generated at optical station 24, and also manipulate the image processing software used to generate the image of the portioned/cut workpiece and corresponding cutting paths. By the present system, remotely located personnel are able to monitor numerous installations of portioning systems without having to travel to the actual location of the system. As such, the analysis of a problem occurring in a portioning system may be more rapidly analyzed and corrected than if it were necessary for personnel to physically travel to the installation site.

Moreover, as discussed above, the present system 10 also includes automated approaches to monitoring and analyzing the operation and portioning systems utilizing the images of the cutter travel paths used to portion or trim the workpieces and comparing such cutter travel paths with the predetermined expected cutter travel paths. The information that may be obtained by such comparison can be used to correct problems or issues with the portioning system before they become serious, including those issues that are not readily discernible by operational or monitoring personnel viewing the operation of the portioning system.

While illustrative embodiments have been illustrated and described, it will be appreciated that various changes can be made therein without departing from the spirit and scope of the invention.

The embodiments of the invention in which an exclusive property or privilege is claimed are defined as follows:

1. An apparatus to acquire and analyze product specific data for food product cutting and trimming, comprising:
   (a) a conveyance system having a transport surface for transporting a stream of separated food products in transport direction;
   (b) a scanner for acquiring food product specific physical data as the food products are being transported on the conveyance system;
   (c) a control system operably connected to the scanner and designed and configured to receive and analyze the food product specific physical data from the scanner and based on the food product specific physical data, determining how to cut the food products into desired shapes and sizes or determining how to trim the food products as desired, including predetermining the cutting or trimming paths to be used;
   (d) a cutter controlled by the control system to cut or trim the food products along the cutting or trimming paths previously determined by the control system as the food products are being transported on the conveyance system; and
   (e) a vision [optical/camera] system operably connected to the control system to capture visually specific data of the food products after cutting or trimming, including the actual cutting or trimming paths traveled by the cutter;
   (f) wherein the control system compares the actual cutting or trimming paths with the predetermined cutting or trimming paths and analyzes the extent of alignment of the actual cutting or trimming paths with the predetermined cutting or trimming paths thereby providing an indication of whether the cutter is operating within present physical parameters.

2. The apparatus according to claim 1, wherein if the alignment of the actual cutting or trimming paths with the predetermined cutting or trimming path are not within a predetermined set point, the control system seeks to determine the cause of the deviation.

3. The apparatus according to claim 1, wherein if the alignment of the actual cutting or trimming paths with the predetermined cutting or trimming paths are not within a predetermined set point, the control system seeks to determine remedial steps to restore the alignment of the actual cutting or trimming paths with the predetermined cutting or trimming paths within the predetermined set point.

4. The apparatus according to claim 1, wherein the control system selects specific food products from the stream of food products for the vision [optical/camera] system to capture the actual cutting or trimming paths of the cutters or trimmers.

5. The apparatus of claim 1, wherein specific food products are selected from the stream of food products for capture of the actual cutting or trimming paths based on one or more of the following:
(a) physical data of the food products from the scanner;
(b) physical data of the food products and/or the cutting paths captured by the vision [optical/camera] system;
(c) instructions from operational or monitoring personnel; and
(d) a sampling program being followed by the control system.

6. The apparatus of claim 5, wherein the system operational or monitoring personnel selects the individual food products from the stream of food products for capturing the actual cutting or trimming paths (1) after scanning and before cutting or trimming, or (2) after cutting or trimming.

7. A system for monitoring the operation of a food portioning/trimming system, the food portioning/trimming system including a conveyor system for conveying food products in a stream along a conveying direction, a scanner for scanning the food products to ascertain physical characteristics of the food products, a cutter for portioning/trimming the food products, the monitoring system comprising:
a control system receiving data from the scanner pertaining to the physical characteristics of the food products and determining how to portion/trim the food products as desired including predetermining the cutting paths of the cutter, the monitoring system;
a vision [optical/camera] system operably connected to the control system to capture visually specific data of the food products after portioning or trimming, including the actual cutting paths of the cutter through the food products; and
wherein the control system compares the actual cutting paths of the cutter with the predetermined cutting paths to thereby ascertain whether the food product portioning/trimming system is operating within desired parameters.

8. The monitoring system of claim 7, wherein if the food portioning/trimming system is not operating within desired parameters, the control system seeks to determine potential remedial action needed to restore operation of the food portioning/trimming system within operational parameters.

9. The monitoring system of claim 7, wherein the control system selects specific food products from the stream of food products and instructs the vision system to capture the actual cutting paths of the cutter of the selected food products.

10. The monitoring system of claim 7, wherein selection of the food product from the stream of food products for capture of the actual cutting paths by the vision system is based on one or more of the following:
(a) physical data of the food products from the scanner;
(b) physical data of the food products and/or cutting paths of the cutter captured by the vision system;
(c) instructions from operational or monitoring personnel; and
(d) a sampling program being followed by the control system.

11. The monitoring system of claim 10, wherein the selection made by the operational/monitoring personnel occurs either before or after the portioning/trimming of the selected food product.

12. A method for cutting or trimming food products, comprising:
(a) conveying a stream of individual food products on a conveyance system along a conveyance direction;
(b) scanning the food products for food product specific physical data as the food products are being transported on the conveyance system;
(c) transmitting the food product specific physical data from a scanner to a control system that is designed and configured to receive and analyze the food product specific physical data from the scanner and using such food product physical data to determine how to cut the food product into desired shapes or sizes or how to trim the food product as desired, including predetermining the cutting/trimming paths of the cutters used to cut/trim the food products;
(d) cutting or trimming the food product with cutters controlled by the control system to travel along the cutting/trimming paths previously determined by the control system, as the food products are being transported by the conveyance system;
(e) visually capturing the actual cutting/trimming paths of the cutters through the food products and comparing such actual cutting/trimming paths with the control system predetermined cutting/trimming paths and analyzing the extent of alignment of the actual cutting/trimming paths with the predetermined cutting/trimming paths; and
(f) if the extent of alignment of the actual cutting/trimming paths with the predetermined cutting/trimming path is not within a predetermined set point level, seeking to determine the cause of the misalignment.

13. The method according to claim 12, further comprising taking remedial steps to restore alignment of the actual cutting/trimming paths within a preselected range of alignment with the predetermined cutting or trimming paths.

14. The method according to claim 12, further comprising the control system instructing a vision [optical/camera] system to capture the actual cutting/trimming paths of the cutters for selected food products from the stream of food products.

15. The method according to claim 14, wherein selecting the food products from the stream of food products for capture of the actual cutting/trimming paths of the cutters/trimmers is based on one or more of the following:
(a) the physical data of the food products from the scanner;
(b) the physical data of the food products and/or the cutting/trimming paths captured by the vision system;
(c) instructions from operational or monitoring personnel; and
(d) a sampling program being followed by the control systems.

16. The method of claim 15, wherein the selection by operational/monitoring personnel occurs either before or after cutting/trimming of the food product.

17. A method for monitoring the operation of a food product portioning/trimming system, the food product portioning/trimming system including: a conveyor system for conveying a stream of individual food products in a conveyance direction; a scanner for scanning the food products to ascertain physical parameters of the food products; at least one cutter for portioning/trimming the food products; and a control system for receiving data from the scanner pertaining to the physical parameters of the food products and determining how to portion/trim the food products including predetermining the cutting paths of the at least one cutter, the method comprising:

visually capturing the actual cutting paths of the at least one cutter from the stream of food products; and comparing the extent of alignment of the actual cutting paths of the at least one cutter with the predetermined cutting paths of the at least one cutter to thereby ascertain whether the food portioning/trimming system is operating within desired parameters.

18. The method of claim 17, further comprising if the alignment of the actual cutting paths is not within a predetermined a set point with respect to the predetermined cutting paths investigating the cause of the misalignment.

19. The method of claim 17, further comprising capturing visually related data for selected food products after cutting.

20. The method of claim 17, selecting specific food products for visually capturing the actual cutting paths of the specific food products is based on one or more of the following:

(a) the physical data of the food products from the scanner;

(b) the physical data of the food products and/or cutting paths captured by a vision [optical/camera] system;

(c) instructions from operational or monitoring personnel; and (d) a sampling program followed by the control system.

21. The method of claim 20, wherein the selection made by operational or monitoring personnel occurs either before or after the portioning/trimming of the food products.

* * * * *